United States Patent [19]

Iwasa et al.

[11] Patent Number: 5,105,352
[45] Date of Patent: Apr. 14, 1992

[54] OFFSET CORRECTION CIRCUIT OF PWM INVERTER

[75] Inventors: Masao Iwasa, Chiba; Hirofumi Sugiura, Aichi, both of Japan

[73] Assignee: Otis Elevator Company, Farmington, Conn.

[21] Appl. No.: 606,787

[22] Filed: Oct. 31, 1990

[30] Foreign Application Priority Data

Nov. 7, 1989 [JP] Japan ................................. 1-289288

[51] Int. Cl.$^5$ ......................................... H02M 7/527
[52] U.S. Cl. ..................................... 363/98; 363/132; 318/811
[58] Field of Search ..................................... 363/39–41, 363/46, 95, 98, 131, 132; 318/801, 805, 806, 811

[56] References Cited

U.S. PATENT DOCUMENTS

| | | | |
|---|---|---|---|
| 4,739,464 | 4/1988 | Nishihiro et al. | 363/41 X |
| 4,825,132 | 4/1989 | Gritter | 318/811 |
| 4,882,120 | 11/1989 | Roe et al. | 363/41 X |
| 4,920,472 | 4/1990 | Handler | 363/41 X |
| 4,939,633 | 7/1990 | Rhodes et al. | 363/41 X |
| 4,969,079 | 11/1990 | Kiriyama et al. | 363/41 |

FOREIGN PATENT DOCUMENTS 9165969 9/1984 Japan ............................. 363/41 X Primary Examiner—Steven L. Stephan
Assistant Examiner—Emanuel Todd Voeltz

[57] ABSTRACT

The DC offset in a current control system for a PWM inverter drive is corrected by integrating a DC component of a current control signal provided by a current control amplifier and feedback controlling the current control amplifier to reduce the DC component to zero.

7 Claims, 2 Drawing Sheets

OFFSET CORRECTION CIRCUIT OF PWM INVERTER

TECHNICAL FIELD

This invention relates to a pulse width modulated (PWM) drive and, more particularly, to an offset correction circuit for current control.

BACKGROUND ART

As an example, a prior art PWM inverter having a current control circuit has a block configuration shown in FIG. 2. The DC power is taken via a rectifier 2 from an AC power source 1 and fed to an inverter main circuit 3, which supplies AC power with a PWM waveform having adjusted fundamental frequency and voltage to an induction motor 4 as a load. The control device of inverter main circuit 3 comprises a speed control amplifier 6 which is responsive to a difference signal on a line 6c from a summing junction 6d which compares a speed setting signal (Ns) on a line 6a and a detected signal on a line 6b from a speed detector 5 coupled to motor 4. The amplifier 6 performs a PI operation and provides an amplified signal on a line 6e to a sinusoidal wave generating circuit 7 which generates a sinusoidal signal on a line 7a for adjusting the frequency and voltage according to the speed instruction of amplifier 6. A current control amplifier 9 which amplifies (i.e., performs PI operation) an error signal on a line 9a from a summing junction 9b indicative of a difference between the magnitude of the current instruction signal on line 7a and a detected output current signal on a line 8a from a current detection circuit 8 responsive to the current provided by inverter main circuit 3 to the motor 4 by means of a sensor 8b. A PWM circuit 10 is responsive to an amplified difference signal on a line 9b from the amplifier 9 and provides PWM gating signals on a plurality of lines indicated generally by a line 10a in order to effect an appropriate output waveform for driving the motor by performing ON/OFF control for a corresponding plurality of switch elements in various phases of inverter main circuit 3.

In the conventional PWM inverter having a current control system, when there exists an offset in the current detector and current instruction (sinusoidal wave) that form the current control system, the offset voltage makes the output current of inverter main circuit 3 deviate from the ideal AC waveform as a DC component is overlapped on it, thus causing torque ripple and other problems.

In the conventional scheme, in order to compensate for the offset, as the motor is stopped, the offset amounts in the current instruction and the current detection signal are detected, and compensation signals corresponding to these detected offset amounts are applied during operation.

However, in long-term continuous operation, the offset amount varies as the temperature drifts. In this case, correction becomes impossible. In particular, the temperature drift is large for the current detector, and it is difficult to correct the offset caused by the current detection system. As temperature variation is also caused by seasons, proper correction is impossible. This is a problem.

DISCLOSURE OF INVENTION

The object of the present invention is to teach how to correct the offset in a current control for a PWM inverter and to show how to provide an offset correction circuit which can reliably and easily correct the offset in the current control system.

According to the present invention, in a PWM inverter having a current control system, by integrating the DC component of the current control amplifier and providing the integrated signal to said amplifier in a direction to eliminate the DC component, the offset of the current control system is corrected.

In a PWM inverter drive control system having a current control amplifier which provides the control signal of a PWM circuit in response to a difference signal obtained by comparing the magnitudes of a sinusoidal current instruction signal and a sensed signal indicative of the inverter output current, in further accord with the present invention, a type of offset correction circuit is provided comprising an integrating amplifier which integrates the DC component of the output of the said current control amplifier and an inverting amplifier which inverts the output of the integrating amplifier for summation with said difference signal in a direction to eliminate the DC component. Thus, when a DC component is generated in the output of the current control amplifier, the DC component is detected by the integrating amplifier, and with the aid of the inverting amplifier, the detected value is inverted and added to the input of the current control amplifier to eliminate the said DC component and thereby perform the offset correction. Due to this correction, the offset amount can be kept at nil as the correction is performed corresponding to the variation in the offset amount, such as that due to the temperature drift during operation.

These and other objects, features and advantages of the present invention will become more apparent in light of the following detailed description of a best mode embodiment thereof, as illustrated in FIG. 1 of the accompanying drawing.

BEST MODE FOR CARRYING OUT THE INVENTION

Figure 1:
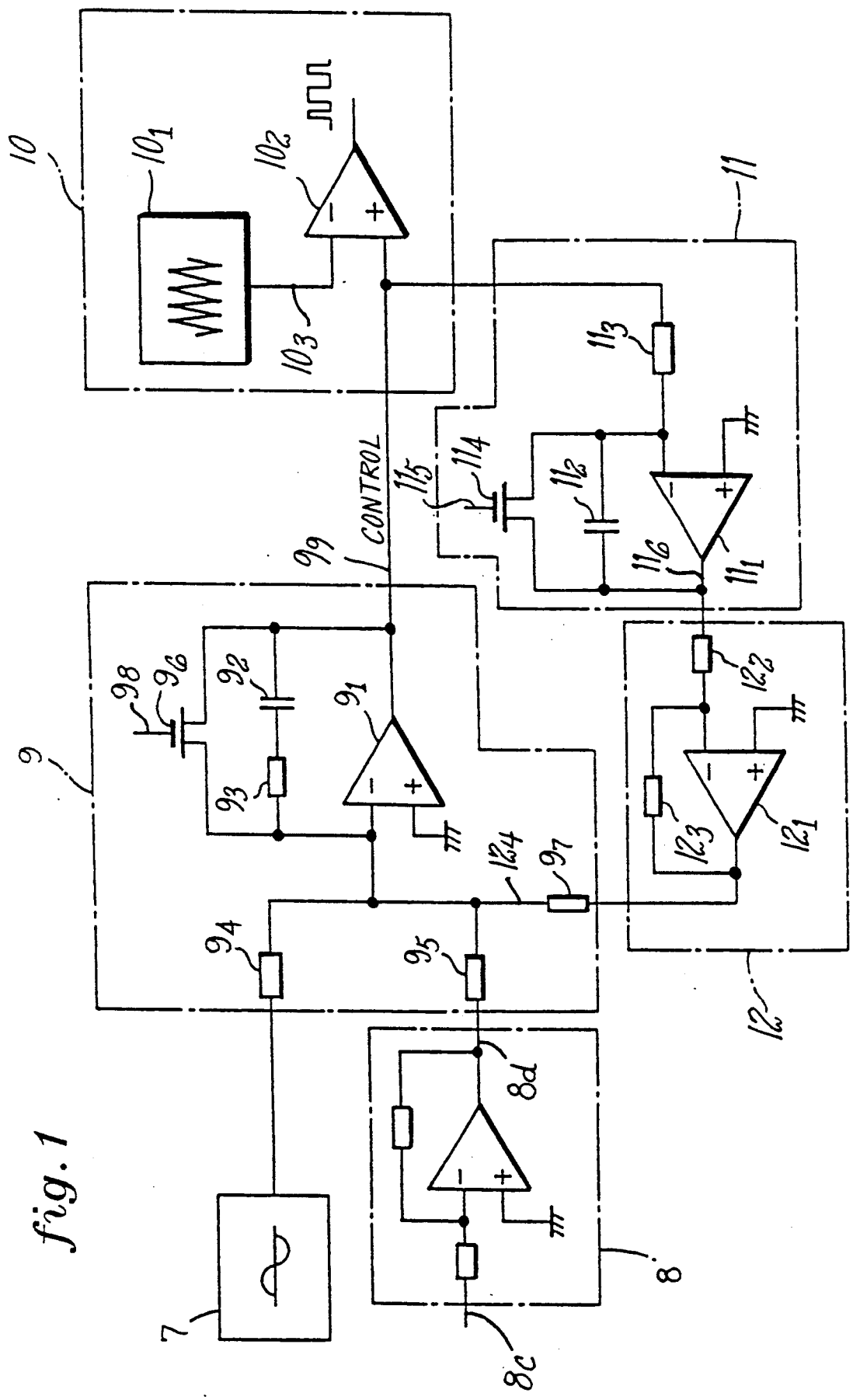
FIG. 1 is a schematic diagram illustrating an application example of a best mode embodiment according to the present invention.
Figure 2:
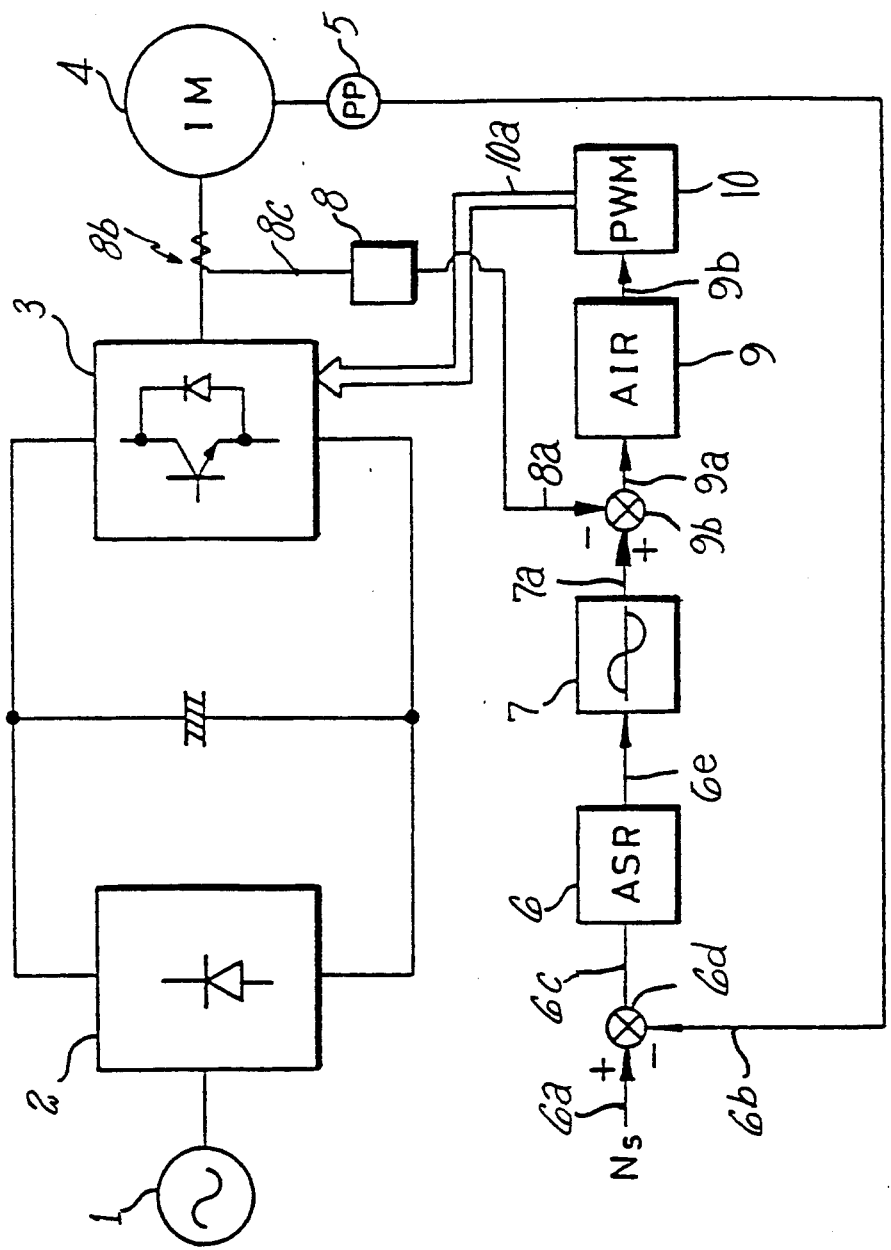
FIG. 2 is a block diagram of a prior art PWM inverter control system.

FIG. 1 is a circuit diagram of the main portion of a single phase as an application example of a best mode embodiment, according to the teachings of the present invention. The symbols used here are identical to those used in FIG. 2. From an output current detection circuit 8, which may be responsive to a current transformer 8a or the like, the signal level of a detected current signal on a line 8c is adjusted to obtain a low-output-impedance sinusoidal detected signal on a line 8d. Current control amplifier 9 may consist of an operational amplifier $9_1$, a serial feedback circuit made of capacitor $9_2$, and resistors $9_4$ and $9_5$ of an input adder which serves the same function as the summing junction 9b shown in FIG. 2, except that the input adding circuit of FIG. 1 also has a resistor $9_7$ for performing input addition of an offset correction signal to be described later. Amplifier 9 performs PI operation for the error between the sinusoidal current instruction of sinusoidal wave generating circuit 7 and the sinusoidal detected signal of current detection circuit 8. In addition, current control amplifier 9 has an analog switch $9_6$ which is parallel to the feedback circuit of operational amplifier $9_1$ and is used to perform the ON/OFF control by a start/stop signal on a line $9_8$ of motor 4. In the PWM circuit 10, an output signal on a line $9_9$ from current control amplifier 9 and an output signal on a line $10_3$ from a triangular wave generator $10_1$ are taken as the inputs to a comparator $10_2$, and a PWM waveform with a width proportional to the output level and polarity of amplifier 9 is obtained.

In the illustrated case, in order to correct the offset, an integrating amplifier 11 an inverting amplifier 12 are arranged as shown. Integrating amplifier 11 is responsive to and integrates an output signal on the line $9_9$ of current control amplifier 9 by using operational amplifier $11_1$, feedback capacitor $11_2$ and input resistor $11_3$. Also, it has an analog switch $11_4$ in parallel to capacitor $11_2$. This analog switch is responsive to a signal on a line $11_5$ which turns the switch $11_4$ off (open circuited or non-conducting) when motor 4 is in operation or when the rotating speed is higher than a selected level (integration is allowed in this case); on the other hand, it turns on when motor 4 is stopped or the rotating speed is lower than the selected level (reset). Inverting amplifier 12 is responsive to an integrated signal on a line $11_6$ from integrator 11 and has an operational amplifier $12_1$ and resistors $12_2$, $12_3$. It inverts and amplifies the output signal on the line $11_6$ from integrating amplifier 11 and provides, via the resistor $9_7$, an offset correcting signal on a line $12_4$ to the summing junction in current control amplifier 9.

The integrating time constant T of integrating amplifier 11, which is the product of the capacitance C of capacitor $11_2$ and the resistance R of resistor $11_3$, is sufficiently larger than period 1/f of the inverter's output frequency $f_o$ to effectively integrate only the DC component thereof. In addition, resistance $9_7$ of current control amplifier 9 is much larger than the resistances of resistors $9_4$ and $9_5$.

In this configuration, the output of current control amplifier 9 has an ideal AC waveform. When there exists a DC component due to temperature drift of the current detector, etc., and when the DC component varies, this offset component is integrated and amplified by integrating amplifier 11 and it then has its polarity adjusted by inverting amplifier 12 so that a DC bias with a polarity and level which cancels the offset component is fed back to current control amplifier 9 and offset correction is thus realized. As this correction is performed corresponding to the offset component, the offset can be kept at nil at all times.

As mentioned, in the illustrated case, the integrating time constant T of integrating amplifier 11 has a time constant much longer than the period of the sinusoidal signal so that only the DC component is corrected. Also, analog switch $11_4$ may be turned off during operation or when the rotating speed of the motor is higher than a preset level, so that the offset correction is enabled. It is then turned on when the motor is stopped or in low speed operation so that the integrated output is reset. Also, as current control amplifier 9 is controlled OFF/ON in correspondence to the start/stop state of analog switch $9_6$, reset is performed while stopped. Control of these analog switches $11_4$, $9_6$ enables offset correction to be performed only during operation or when the rotating speed is higher than a selected or preset level. Hence, it is now possible to prevent the adverse influence of offset on the current control system.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. An offset correction circuit for a current control amplifier responsive to a difference signal having a magnitude indicative of the difference between the magnitude of a sinusoidal current command signal and a sensed signal indicative of the magnitude of the inverter's output current, for providing a control signal for controlling a PWM circuit, comprising:
   an integrating amplifier, responsive to said control signal, for integrating the DC component of said control signal and providing an integrated signal having a magnitude indicative of said DC component; and
   an inverting amplifier, responsive to said integrated signal, for providing an inverted signal for summation with said difference signal.

2. A method for correcting a DC component in a current control signal provided by a control for controlling a PWM inverter responsive to a difference signal indicative of the difference between commanded and sensed current signals, comprising the steps of:
   integrating the DC component of said current control signal and providing an integrated signal; and
   summing said integrated signal to said difference signal for canceling said DC component.

3. An offset correction circuit of a PWM inverter characterized by the following features: the PWM inverter has a current control amplifier which provides the control signal of a PWM circuit by using the signal derived by comparing the sinusoidal current instruction and the detection signal of the inverter output current; in this PWM inverter, there is an integrating amplifier which integrates the DC component of the output of said current control amplifier, and an inverting amplifier which sends and adds the output of the integrating amplifier to said current control amplifier in a direction to eliminate said DC component.

4. A PWM inverter control circuit comprising:
   a current control amplifier (9) responsive to a difference signal having a magnitude indicative of the difference between the magnitude of a sinusoidal current command signal (7) and a sensed signal (8c) indicative of the magnitude of the inverter's output current, for providing a control signal ($9_9$) for controlling a pulse width modulator circuit (10);
   an integrating amplifier (11), responsive to said control signal, for integrating the DC component of said control signal and providing an integrated signal ($11_6$) having a magnitude indicative of said DC component; and
   an inverting amplifier (12), responsive to said integrated signal, for providing an inverted signal for summation with said difference signal.

5. A circuit as claimed in claim 4 wherein said integrating amplifier (11) includes switch means ($11_4$) arranged to reset the integrator when a motor driven by the inverter is stopped or running below a predetermined speed.

6. A circuit as claimed in claim 4 wherein said current control amplifier (9) performs a PI control operation and includes switch means ($9_6$) arranged to reset the amplifier when a motor driven by the inverter is stopped or running below a predetermined speed.

7. A method of correcting a DC component in a current control signal provided by a control circuit for controlling a PWM inverter responsive to a difference signal indicative of the difference between commanded and sensed current signals, comprising the steps of:

integrating the DC component of said current control signal and providing an integrated signal;

inverting said integrated signal; and summing said inverted integrated signal to said difference signal for canceling said DC component.

* * * * *